(12) United States Patent
Nickeas et al.

(10) Patent No.: US 8,341,988 B2
(45) Date of Patent: Jan. 1, 2013

(54) MAGNET ACTIVATED SECURITY SYSTEM

(76) Inventors: Mark Nickeas, Westlake Village, CA (US); Martin Nickeas, Oxnard, CA (US)

(*) Notice: Subject to any disclaimer, the term of this patent is extended or adjusted under 35 U.S.C. 154(b) by 0 days.

(21) Appl. No.: 13/037,201

(22) Filed: Feb. 28, 2011

(65) Prior Publication Data
US 2012/0055214 A1    Mar. 8, 2012

Related U.S. Application Data

(60) Provisional application No. 61/309,082, filed on Mar. 1, 2010.

(51) Int. Cl.
*E05B 47/00* (2006.01)

(52) U.S. Cl. ............... 70/276; 70/175; 70/382; 70/387; 70/413

(58) Field of Classification Search .......... 70/175, 70/229, 231, 232, 276, 352, 387, 413
See application file for complete search history.

(56) References Cited

U.S. PATENT DOCUMENTS

| | | | |
|---|---|---|---|
| 3,995,460 A * | 12/1976 | Sedley | 70/210 |
| 4,133,194 A | 1/1979 | Sedley | |
| 4,223,799 A * | 9/1980 | Eyster et al. | 70/276 |
| 4,333,327 A | 6/1982 | Wake | |
| 4,390,038 A * | 6/1983 | Salvato | 70/276 |
| 4,716,922 A * | 1/1988 | Camp | 70/276 |
| 5,072,750 A | 12/1991 | Poms et al. | |
| 5,205,312 A * | 4/1993 | Jerman et al. | 70/175 |
| 5,291,766 A * | 3/1994 | Eisermann | 70/276 |
| 6,089,253 A * | 7/2000 | Stehling et al. | 70/276 |
| 6,802,338 B1 * | 10/2004 | Istre, Jr. | 70/276 |
| 6,840,071 B2 * | 1/2005 | Sedley | 70/276 |
| 7,080,533 B2 * | 7/2006 | Sedley | 70/276 |

FOREIGN PATENT DOCUMENTS

DE    4022634 A1    1/1991

OTHER PUBLICATIONS

Written Opinion and Search Report of International Application No. PCT/US2011/000382, mailed Jun. 8, 2011.

* cited by examiner

*Primary Examiner* — Christopher Boswell
(74) *Attorney, Agent, or Firm* — Koppel, Patrick, Heybl & Philpott; Michael J. Ram (57) ABSTRACT

A locking device for securing a structure comprising an inner body having an inner surface for attachment to the structure, an outer cover located circumferentially about the inner body, the outer cover freely rotating around the inner body in its securing configuration and a key for insertion into an opening in the outer body. First and second magnets are located in spaced apart first and second cavities within the key such that the magnets are oriented with the south pole of the first magnet and the north pole of the second magnet facing in the same direction. The magnets act on a pin within the body of the lock such that, in a first embodiment, when the key is removed from the lock body the pin is magnetically held away from contact with the inner body resulting in a free turning, locked configuration. When the key is inserted into the locking device the pin relocates to a second position causing the inner and outer body to move simultaneously so that rotational force applied to the outer cover is transmitted to the inner body placing the locking device in an unlocked configuration.

8 Claims, 6 Drawing Sheets

MAGNET ACTIVATED SECURITY SYSTEM

Benefit is claimed of Provisional Application Ser. No. 61/309,082, filed Mar. 1, 2010.

BACKGROUND

The present disclosure generally relates to locks, and more particularly, to a security device for engaging a threaded element to prevent unauthorized access thereto, regardless OF whether the threaded element is a port of, or a control for, a fluid passageway, a controller, an access device or any other similar or like configured device or assembly.

Conventional locking devices for threaded elements have several disadvantages. One prominent disadvantage is that conventional locking devices attempt to rigidly secure the threaded element. However, this subjects the locking device to abuse and malfeasance because tools or other implements may be used to gain leverage or other advantage on the locking device. As a result, such conventional locking devices can often be easily defeated and removed by the application of brute force.

Therefore, there exists a need in the art for a security device for threaded elements that overcomes the disadvantages of the conventional devices, is inexpensive to manufacture and is easy to assemble and operate.

BRIEF DESCRIPTION OF THE DRAWINGS

Certain embodiments are shown in the drawings. However, it is understood that the present disclosure is not limited to the arrangements and instrumentality shown in the attached drawings.

SUMMARY

In accordance with one aspect of the present disclosure, a security device for engaging a threaded element includes an inner body configured to engage the threaded element and an outer body operatively coupled to the inner body. A lock is configured to engage the outer body and is operable such that the outer body moves with the inner body when the lock pin is in an extended configuration and freely rotates relative to the inner body when the lock pin is in a retracted configuration.

DETAILED DESCRIPTION OF THE DISCLOSURE

For the purposes of promoting and understanding the principles disclosed herein, reference is made to a first embodiment illustrated in the drawings and specific language will be used to describe the same. It is nevertheless to be understood that no limitation of the scope is thereby intended. Such alterations and further modifications in the illustrated device and such further applications of the principles disclosed and illustrated herein are contemplated as would normally occur to one skilled in the art to which this disclosure relates. The security device described herein has numerous applications, as described below, for securing structures other the first embodiment disclosed for use as a securing device on a hose bib.

Figure 1:
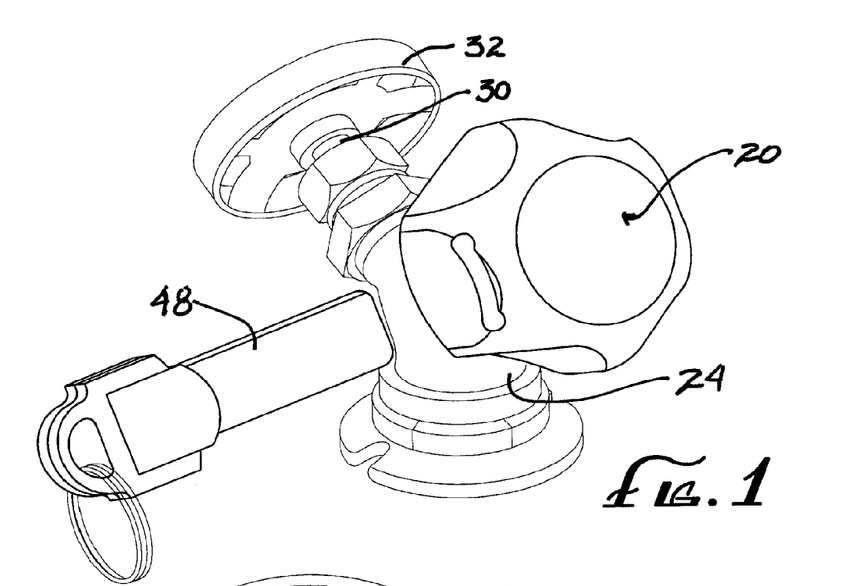
FIG. 1 is a front perspective view of a security device incorporating features of the invention attached to a threaded element showing the key removed from the security device.

Referring to FIG. 1, a security device 20 constructed in accordance with the teachings of one embodiment of the present disclosure is shown connected to the threaded element 21, which in one embodiment may be configured as a port for a fluid passageway commonly disposed on an exterior of a structure, also commonly known as a hose bib 24 or may be configured as a control structure threaded to devices where access is intended to be limited to certain individuals. Although the security device 20 is shown in FIG. 1 connected to the hose bib 24, as will become apparent from the following, the security device 20 is connectable to any threaded element, port or control to prevent unauthorized access. It is also within the teachings of the present disclosure that the threaded element as described herein is not in a limiting sense. Rather, any port, control or other similar or like device, assembly, element or structure to which access is to be limited shall be considered within the threaded element expression.

In one embodiment, the hose bib 24 includes an inlet 22 that is attached to a waterline (not shown) from which the inlet 22 receives water. The hose bib 24 also includes a port, which is not visible in the figures as it is covered by the security device 20, from which the water can flow. Disposed between the inlet 22 and the port is a ball valve within the hose bib that controls the flow of water from the inlet 22 to the port 26. The ball valve includes a valve stem 30 that extends upward through the body of the hose bib 24. A handle 32 is attached to the valve stem 30 so that a user can control the ball valve 28, thereby controlling the flow of water between the inlet 22 and the port (i.e., turning on or shutting off the water).

The security device 20 may be connected to the port by being screwed onto the threaded port or by other suitable connection methods. The security device 20 includes an inner body 50 and a free spinning outer cover 40. The security device 20 further includes a locking structure 38 comprising lock body 42 a magnetic plate 62 and a moveable lock pin 44, the lock pin 44 being a magnet. The side of the outer cover 40 has a key opening 46 for receiving a key 48 that causes the lock pin 44 to move in or out of engagement with the inner body 50.

When the security device 20 is configured in a secured position, which occurs when the key 48 is removed from the outer cover 40, the security device 20 cannot be unscrewed, disconnected or removed from the threaded element 21 or other structure to which it is secured. In this secured position the outer cover 40 spins freely around the inner body 50, while said inner body 50 remains attached in a securing mode to the threaded element 21. Any attempt to remove, bypass or defeat the security device 20 by turning the security device 20 while in the secured position merely results in the outer cover 40 freely rotating relative to the inner body 50 of the security device 20.

When the security device 20 is configured in the unsecured position (the configuration for removing the securing device 20) by placing the proper key 48 into the key opening 46 in the outer cover 40, the lock pin 44 engages the inner body 50 with the lock body 42, so that the inner body 50 and the outer cover 40 rotate as a single unit. Accordingly, movement of the free spinning cover 40, for example by rotation, causes the inner body 50 to move about the threaded element 21, which in turn unthreads the security device 20 from the port threaded element 21.

Referring to FIGS. 3-7, the security device 20 is shown in more detail. The inner body 50 can have a generally annular structural configuration. In one embodiment, the inner body 50 closes the port by placement of threads 49 formed on an inner surface of the inner body 50 that engage a complimentary counter-threaded threaded element 21 on the outer surface of the port. It is within the scope of the present disclosure that other methods may be used to connect the inner body 50 to the port 26. One of skill in the art will recognize that other similar or like connections or fastening configurations may be used with corresponding success as described herein.

A sealing element 52 may be disposed between the port and the inner body 50 to form a seal there between, thereby preventing any fluid, i.e., liquid or gas, from exiting the port or entering the security device 20. The sealing element 52 can be formed from any suitable material. For example, in one embodiment the sealing element may be a rubber disc. It is within the teachings of the present disclosure that the sealing element may be formed from plastics, synthetic materials, natural materials, metal, or any other suitable material.

The inner body 50 includes a bore 51 for receiving a correspondingly dimensioned non-cylindrical extension, namely the lock pin 44. In one embodiment, the bore 51 is generally centrally disposed in the upper surface of the inner body 50. In a first embodiment the bore 51 is square or rectangular in cross section and the lock pin 44 has the same geometric configuration and is sized to be readily placed therein and removed from the bore 51 as further explained below. The shape of the lock pin 44 and complementary bore 51 is chosen so that a rotational force applied to the lock pin 44 around a longitudinal central axis of the security device 20 will be transmitted to the inner body 50 causing it to also rotate. It is within the teachings of the present disclosure that the lock pin 44 and the bore 51 are configured in any other suitable complimentary manner to provide the indicated functionality.

As best shown in FIGS. 3-6 the locking mechanism 38 comprises a lock body 42, a lock pin 44 and a magnetic plate 62. The lock body has a central hole 53 therein which is of the same non circular geometric configuration and substantially the same circumferential dimensions as the bore 51 in the inner body 50. The lock body 42 has a non-circular outer circumference, shown to be an eight sided structure in FIG. 6, which sets into a similar size and shaped cavity 60 in the upper inner surface of the outer body 40, said cavity best shown in FIG. 7. Positioned between the upper surface of the lock body 42 and the upper inner surface of the outer body 40 is a plate 62.

The outer cover 40 is retained on the inner body 50 by a retainer clip 54, such as a C-ring or O-ring set in a groove 55 in a lower inner surface of the outer body 40 below the bottom of the inner body 40, so as to permit relative rotational movement between the outer cover 40 and the inner body 50 while preventing lateral movement and separation or unintended disassembly of the outer cover 40 from the inner body 50.

A fastener 56 can also be used to connect the cover 40 to the inner body 50. The fastener 56 also facilitates free rotation of the free spinning cover 40 relative to the inner body 50, yet the cover 40 cannot be removed from the inner body 50 by tools, such as pliers or wrenches. In one embodiment of the present disclosure, the fastener 56 is a snap or "C"-ring that has an at-rest diameter larger than the groove 57 formed in the inner surface of the cover 40 but a compressed diameter smaller then a second groove 58 in the outer surface of the inner body 50. Accordingly, such a snap or "C"-ring is under tension when installed within the second groove 58. Those skilled in the art will recognize that other suitable fasteners may be used to achieve the same functionality and are within the teachings of the present disclosure. Preferably, in one embodiment, the fastener 56 is disposed in the grooves 57, 58 and engages an outer end of the inner body 50 and an inner end of the outer body 42 such that inner body 50 rests within an inner end of the cover 40 and presents no discernable edge for manipulation by a tool or other instrument to effect disassembly of the assembled structure.

All of the components of the security device, except for the plate 62 and the lock pin 44 are constructed of materials unaffected by and not attracted to or by magnets (or having a minimal susceptibility to a magnet so as to not interfere with operation of the security device), for example, certain stainless steels (particularly austenitic steels with higher nickel contents), plastics, bronze, brass, copper, aluminum, glass, ceramics, etc. The plate 62, for reasons explained below, is formed from, or has a coating thereon, of a magnetic material (a material that a magnet is attracted too), for example iron or steel, preferably a mild steel about 0.004 in. thick. In a preferred embodiment the lock pin 44 is a magnet with the north and south poles thereof oriented side by side (not above and below with reference to the Figures).

Figures 6, 7, 8:
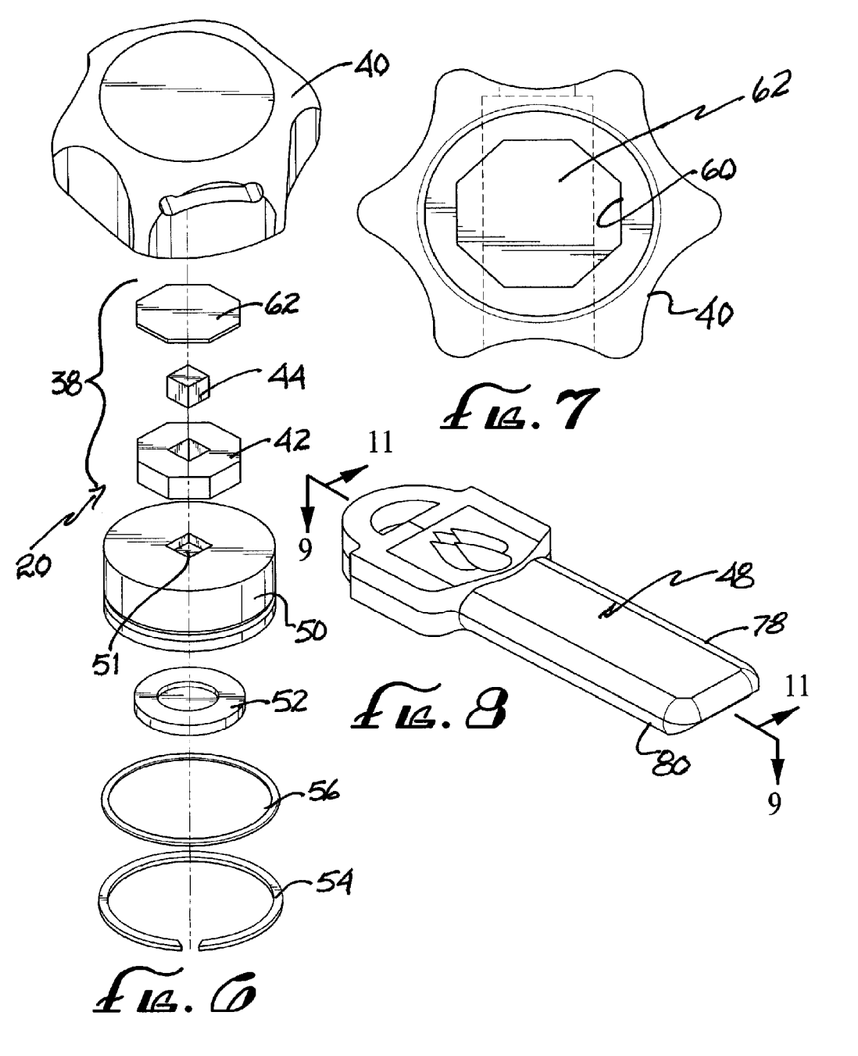
FIG. 6 is an exploded perspective view of the security device of FIG. 3.
FIG. 7 is a bottom view of the free spinning outer cover.
FIG. 8 is a perspective view of a key for use in converting the security device of FIG. 3 from its free spinning configuration to its removable configuration.
Figure 13:
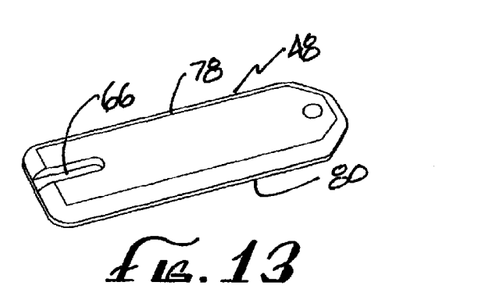
FIG. 13 is a top perspective view of a key with a centrally located groove.
Figure 14:
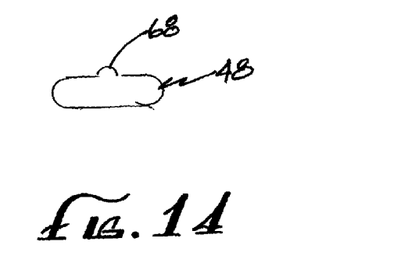
FIGS. 14-16 show end views of three key embodiments which have various different cross-sections.
Figure 15:
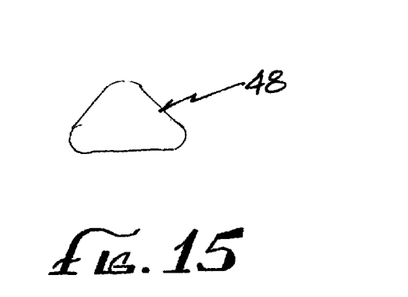
Figure 16:
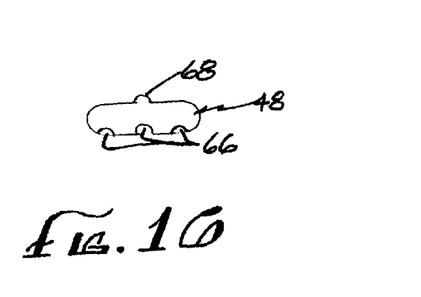

FIG. 8 shows a first embodiment of a key 48, further described below, which is used in conjunction with the security device 20 to convert it from a locked or secured condition to an unlocked or unsecured condition. While a key 48 is shown with a simple external configuration, namely a rectangular or oval cross-section, in FIG. 8, which is inserted in a similar shaped key opening 46 in the outer body 40, one skilled in the art will recognize that numerous different outer cross-sections with similar shaped key openings 46 can be used so as to provide differently keyed security devices. For example, FIG. 13 is a top perspective view of a key embodiment that has a single, centrally located longitudinal slot 66. One skilled in the art will recognize that the slot 66 can be located to the left or right of center on the top and/or bottom of the key at the insertion end, or that multiple slots 66 can be provided on both the top and bottom of the insertion end of the key. Further variations of the external configuration of the insertion end of the key, such as shown in FIGS. 14-16, include raised ribs 68 in one or more locations, combinations of ribs 68 and slots 66 or different geometric cross-sections such as triangular, oval, octagonal, etc.

The security device 20 described herein uses the interaction between magnets as well as magnets with magnetic materials to convert the device between its locked and unlocked configurations. The magnetic properties of all materials make them respond in some way to a magnetic field, but most materials are diamagnetic or paramagnetic and show almost no response to a magnet or a magnetic field. On the other hand ferromagnetic and ferrimagnetic materials show a marked response to magnets and magnetic fields. Certain elements such as iron, cobalt, nickel, and their alloys, some manganese compounds, and some rare earths are ferromagnetic materials (referred to as magnetic materials). Ferrimagnetic materials are compounds of the general composition $MFe_2O_4$ and $M_3Fe_5O_{12}$, where M represents a metal.

With ferromagnetic materials, in the absence of a magnetic field the bulk material appears unmagnetized. However, there is an attraction between magnets and ferromagnetic materials and in the presence of a magnet they are attracted to the magnet strongly enough that the attraction can be felt.

Magnetic materials are further classified as soft or hard according to the ease of magnetization. Soft materials are used in devices in which change in the magnetization during operation is desirable, sometimes rapidly, as in ac generators and transformers. Hard materials are used to supply a fixed field either to act alone, as in a magnetic separator, or to interact with others, as in loudspeakers and instruments.

The term "magnet" is reserved for objects that produce their own persistent magnetic field even in the absence of an applied magnetic field. Only certain classes of materials can do this.

Some metals are paramagnetic, such as platinum and aluminum and are only weakly attracted to a magnet. This effect is hundreds of thousands of times weaker than ferromagnetic materials attraction, and can only be detected by using sensitive instruments, or using extremely strong magnets. For the purposes of the devices described herein they can be considered as non-magnetic.

Diamagnetic materials, such as carbon, copper and plastics, are repelled by both poles of a magnet. Compared to paramagnetic and ferromagnetic substances, these materials are even more weakly repelled by a magnet.

Figures 3, 4, 5:
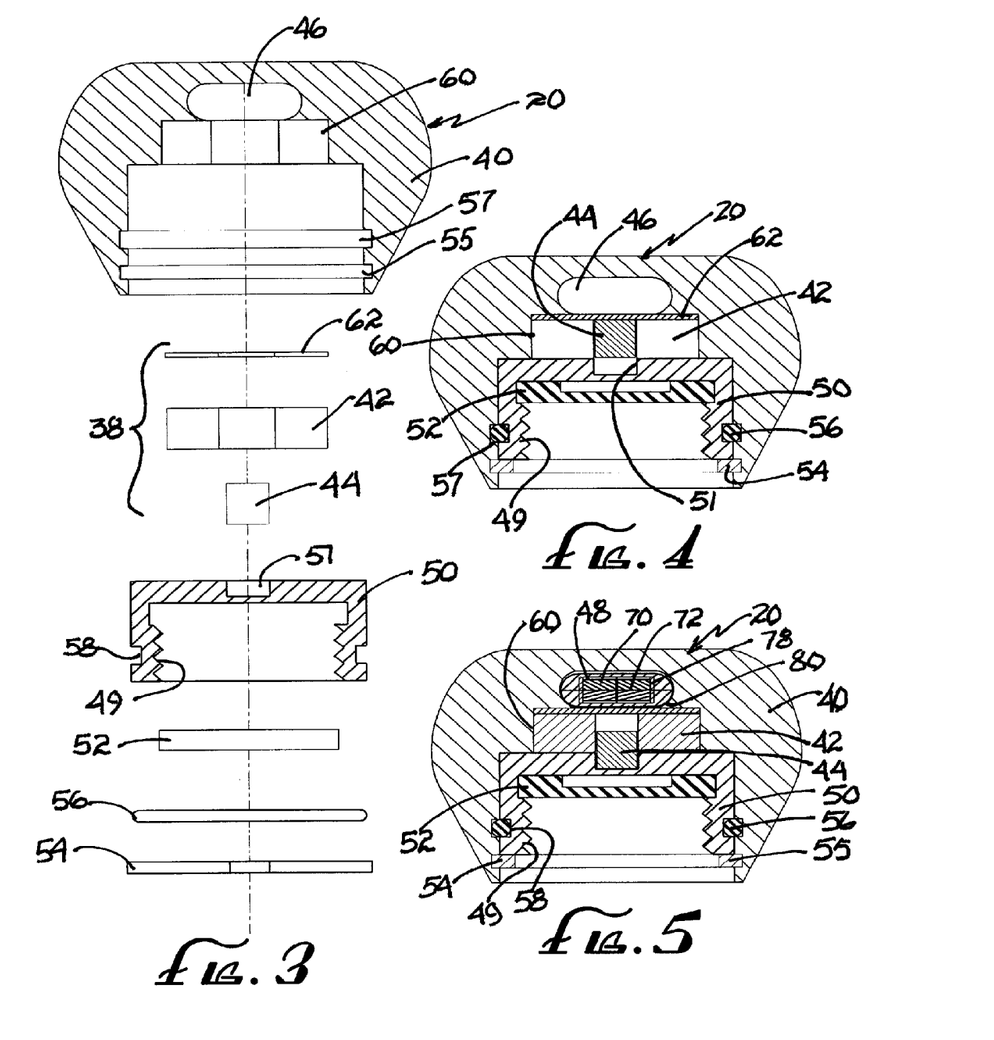
FIG. 3 is an exploded cross sectional view of the security device of FIG. 1 incorporating features of the invention.
FIG. 4 is cross sectional view of the security device of FIG.3 in its secured, free spinning configuration.
FIG. 5 is cross sectional view of the security device of FIG.3 in its removable configuration.

The security device 20 described above operates by using opposing and/or attracting magnets or magnetic materials upon insertion of the proper key 48, to move the lock pin 44 from its resting position (the secured position), as shown in FIG. 4, within the lock body 42 to its operative position (the unsecured position), as shown in FIG. 5, in which the outer cover 40 and the inner body 50 are operatively connected by the lock pin 44 extending partly into the bore 51 in the top of the inner body 50 so that the security device 20 can be removed from the structure which it is securing by rotational force applied to the outer cover 40.

Figures 9, 10, 11:
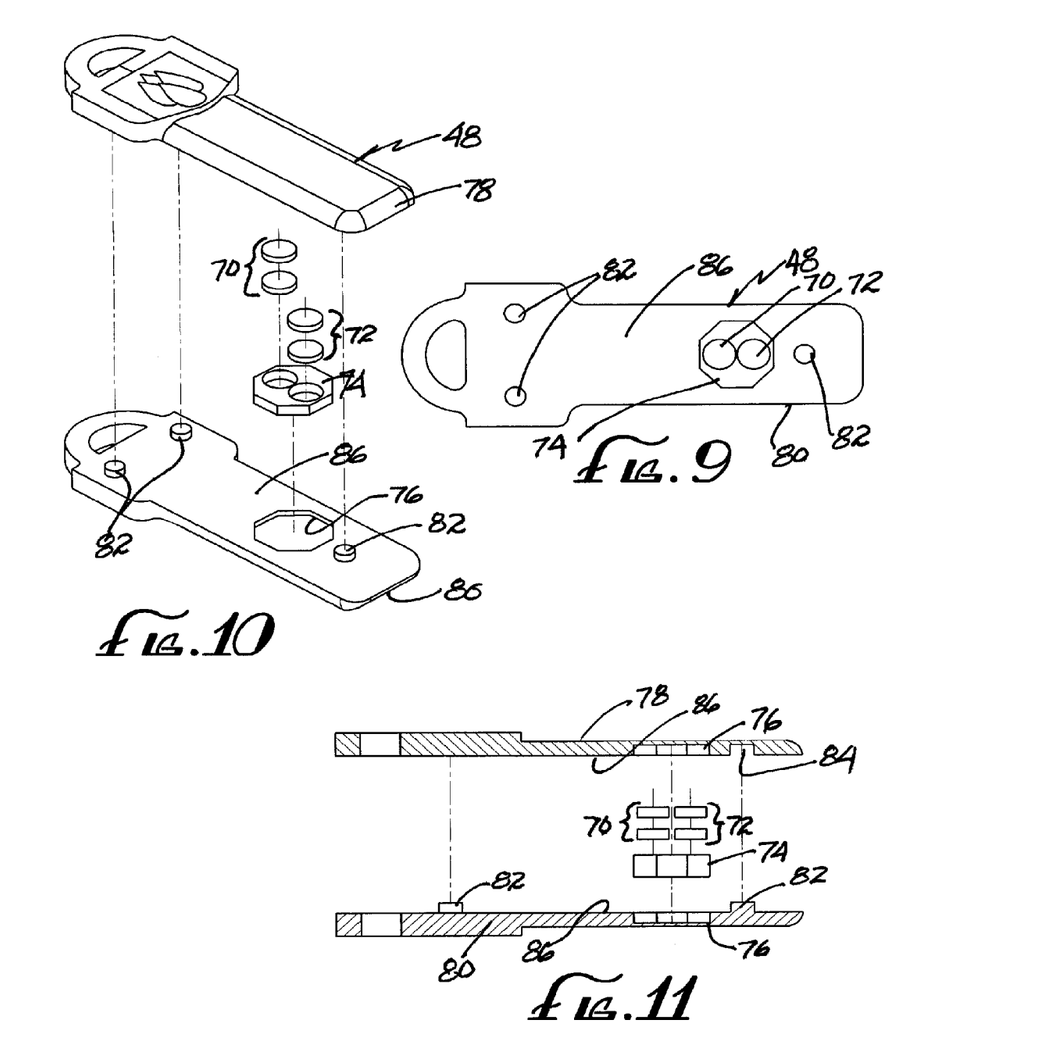
FIG. 9 is a top view of the inner surface of one half of the key of FIG. 8.
FIG. 10 is an expanded perspective view of one embodiment of the key of FIG. 8.
FIG. 11 an expanded cross sectional view of the key of FIG. 10.
Figure 12:
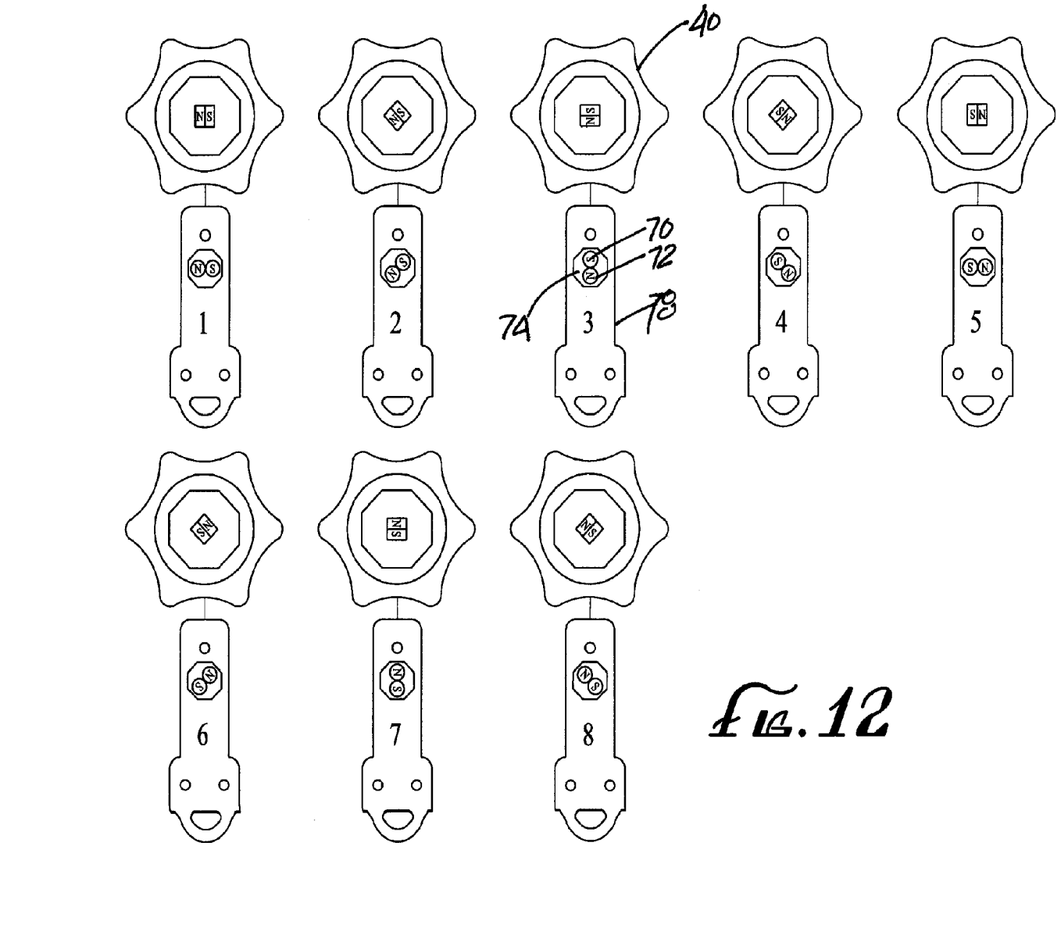
FIG. 12 illustrates eight variations, labeled 1 through 8 of the key of FIG. 10 showing the magnets in different positions within the key and security device.

FIGS. 9-11 show the construction of a first embodiment of the key and eight variations for the magnetic orientations in the lock pin 44 and the magnets 70,72 in the key. The key 48 comprises top and bottom 78, 80 mirror image pieces which are held together by interlocking key pins 82 and pin holes 84 located on or in the inner surfaces 86 of the top and bottom halves 78, 80 of the key 48. Both inner surfaces 86 have a geometric cavity 76 to receive a similar shaped magnet frame 74 which extends into both cavities 76 when the key top and bottom portions 78, 80 are assembled. The embodiment in the Figures shows a magnet frame 74 which is a flat disc with an eight sided geometric outer circumference and two radially spaced holes in the magnet frame 74 to receive two magnets or sets of magnets. The geometric shape of the circumference of the magnet frame 74 is preferably the same as the geometric shape of the lock body 42. Also, while the lock body 42 and the magnet frame 74 are both shown to be eight sided, they can both have fewer or more sides, such as 9, 10, 11, 12, 16, 20, etc. number of sides to provide 9, 10, 11, 12, 16, 20, etc key combinations. FIGS. 10 and 11 show a first and second set of magnets 70, 72 which are arranged, as shown in FIG. 12, with a first magnet or set of magnets arranged with the north pole (N) upward and the second magnet or set of magnets arranged with the south pole (S) upward. This combination of an eight sided frame and two holes allows the frame 74 with inserted magnets 70, 72 to be placed in the cavity 76 in eight different orientations, as shown in FIG. 12 (for simplicity of disclosure, indicia are shown only on configuration 3, the components in the other configurations being similarly labeled) which provides eight different key/security device options. Referring to FIG. 12, the key pin 44 is also a magnet oriented with the north (N) and south (S) poles side by side. With reference to FIG. 5 and the orientation shown therein, when the key is inserted into the outer body the magnets 70, 72 in the key are positioned over the lock pin 44, which is also a magnet with like poles in opposed location. That is, S above S and N above N. This causes the magnets 70, 72 in the key 48 to drive the lock pin 44 downward (away) so that the lock pin 44 rests in the bore 51 placing security device 20 in its unsecured position, allowing it to be removed. When the key 48 is removed from the key opening 46 the lock pin 44, a magnet, because of magnetic attraction between the lock pin 44 and the magnetic plate 62, moves out of the bore 51 toward the plate 62, placing security device 20 in the secured position as shown in FIG. 4. The magnetic force of the magnets 70, 72 in the key 48 is chosen so it is adequate to overcome the magnetic attraction between the lock pin 44 and the plate 62. For example, in a typical embodiment the various magnets have a magnetic force of between 32 to 50 gauss, preferably about 40 gauss, the plate 61 is made of mild steel about 0.004" thick and the gap between the key magnets 70, 72 and the lock pin 44 when the key 48 is inserted into the outer cover 40 is about 0.30". The key pin 44 has a thickness no greater than, and preferably slightly less than, the thickness of the lock body 42. The magnetic forces are chosen so that functioning of the locking mechanism 38 will not be adversely affected by gravity and the security device 20 will function in the same manner irrespective of its orientation.

In the secure position (as shown in FIG. 4) the lock pin 44 magnetically attracted to the plate 61 is disposed in the retracted position into the lock block 42. In the unsecured position (as shown in FIG. 5), which occurs when the key 48 is inserted into the key opening 46 in the outer cover 40, a portion of the lock pin 44 extends from the lock block 42 into the bore 51 in the top of the inner body 50 (shown in FIG. 5), an upper portion of the lock pin 44 remaining within the central opening in the lock body 42. As a result, the outer cover 40, lock block 42, lock pin 44 and the inner body 50 are all operatively connected so that a rotation force applied to the outer cover 40 is transmitted to the inner body 50. Accordingly, in the unsecured position as shown in FIG. 5 any rotational force applied to the outer body 42 also causes a rotation of the inner body 50. In the secured position as shown in FIG. 4, however, the lock pin 44 is retracted inside the lock block 42 and out of engagement with the bore 51. Accordingly, the outer body 40 is free to rotate relative to the inner body 50. Therefore, any rotation of the outer body 40 will not cause a rotation of the inner body 50. To prevent access to the inner body 50 when the security device 20 is in the secure position, the free-spinning cover 40 is freely rotateably mounted to the inner body 50, as described in more detail above. Because of the arrangement of the magnets and the magnetic plate, the security device is unaffected by the application of an external magnet in attempts to unsecure the device.

The security device 20 prevents unauthorized use of the hose bib 24 by preventing access to the port. To lock the hose bib 24 with the security device 20, a user inserts the key 48 to place the security device 20 in the unsecured configuration and then threads the security device 20 onto the threaded element 21 of the port 26, causing the inner threads 49 of the inner body 50 to engage the mating threaded element 21 of the hose bib 24 until the sealing element 52 is slightly compressed. Insertion of the key 48 actuates the locking mechanism 38 such that the lock pin 44 extends to automatically engage the bore 51 in the inner body 50. There is no requirement that the bore 51 and lock pin 44 be aligned in registration prior to actuation of the locking mechanism 38 because the security device 20 automatically aligns when the outer body 40 is rotated to the proper position to effect the lock pin 44 insertion. After the lock pin 44 has been actuated by the key 48 to the extended position, but is not in alignment with the bore 51, the user only needs to rotate the outer body 40 relative to the inner body 50 and the lock pin 44 will automatically engage the bore 51 when they are disposed in aligned registration.

Once the inner body 50 is connected to the port of the hose bib 24 the security device 20 is placed in the secure position so as to prevent access to the port 26 by removing the key 48. Removal of the key 48 results in the lock pin 44 being withdrawn from engagement with the bore 51 in the inner body 50. Thereafter, any rotation of the outer body 40 is not transmitted to the inner body 50 and the hose bib 24 is secured and the threaded element 21 cannot be accessed and the security device 20 cannot be removed. To remove the security device 20 the key is again inserted into the key opening 46, reengaging the locking mechanism 38 so that the inner body 50 can be unscrewed from the port 26.

While the locking mechanism 38 is describe as utilizing a magnetic plate and opposed sets of magnets to place the security device in the unsecured mode, one skilled in the art, based on the teachings herein can assemble a similar operating device with a different arrangement of magnets and weak or strong magnetic materials. Further, the key 48 can be sized so that, when inserted, it appears to be integral with the security device 20, so that the security device is in a normally unsecured configuration and it is converted to a secured configuration by using a special tool (not shown) to remove the key 48. Still further, the security device can be arranged so that a magnetic plate is instead positioned in the bottom of the bore 51 so that the security device is in a normally unsecured configuration and insertion of a key configured as described in regard to FIG. 12, converts it to a secured position by lifting the lock pin 44 out of the bore 51 by magnetic attraction instead of repulsion. Still further, two magnetic plates can be used, the first placed as shown in FIGS. 3-6 and the second in the bottom of the bore 51. In this manner the lock pin 44 can be in either the secured or unsecured configuration by being magnetically attracted to the first or second plate and the configuration being reversed by insertion of the key with magnets oriented to attract or oppose the magnet lock pin 44. This can be accomplished by using the magnet arrangement shown in FIG. 12-3 or 12-7 and inserting the key 48 with the key top 78 oriented upward or downward with reference to FIG. 5.

While the magnet arrangements shown in FIG. 12 applied to the configuration of FIGS. 3-6 provides 8 different key lock combinations, one skilled in the art will recognize that a magnet frame 74 and a lock body 42 can have a different geometric shape or fewer or greater number of sides so as to provide more or less than eight combinations. Further, by modifying the outer surface configuration of the key 48 such as shown in FIGS. 13-14, a much greater number of key lock combinations can be provided.

Figure 2:
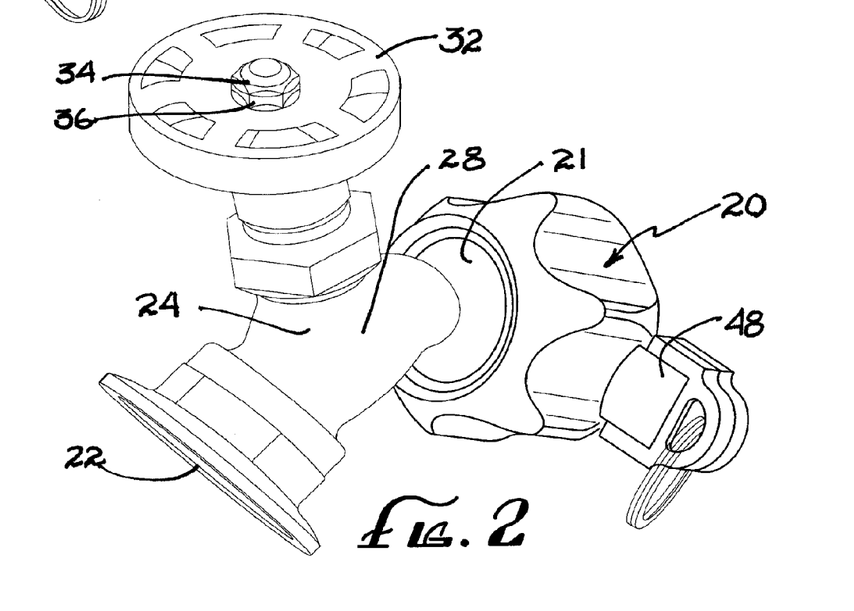
FIG. 2 is a rear perspective view of a security device and threaded element of FIG. 1 showing the key inserted into the security device.

Referring to FIG. 1, the security device 20 can also be attached to the valve stem 30 to prevent operation of the valve 28 or hose bib 24. By removing the handle 32 from the valve stem 30, a threaded portion 34, covered by the nut 36 in FIG. 2, on the valve stem 30 is exposed to provide connection to the inner body 50. Alternatively, if the valve stem does not include a threaded portion and, for example, the handle 32 is retained by a screw (not shown) in the top of the valve stem 30, a separate collar (not shown) with an outer threaded element, which is secured by the same screw can be attached to the valve stem 30. When the security device 20 is connected to the valve stem 30 and is placed in the unsecured position, rotation of the outer body 42 will cause rotation of the inner body 50 and in turn rotate the valve stem 30 to operate the ball valve 28. Accordingly, when the security device 20 is in the unlocked position with key inserted, rotating the outer body 42 can provide the open and close operation of the ball valve 28.

When the security device 20 is placed in the secure position, any attempt by an unauthorized user to operate the ball valve 28 with the security device 20 will cause the outer cover 40 to freely spin about the valve stem 30. Accordingly, when the security device 20 is secure, an unauthorized user cannot access water from the hose bib 24.

One skilled in the art will recognize that the security device 20 is not limited to securing a hose bib but can be used to secure any valve which has an exposed valve stem such as fire hydrants, or water or gas delivery systems. The security device 20 can also be attached to any type of apparatus, device, assembly or other structure with a threaded element. For example, the security device 20 can be sized and configured for attachment to any type of beverage container such as a liquor bottle (not shown), or other like containers. Accordingly, the security device 20 can prevent unauthorized access to the liquor that is in the respective bottle. In another example, the security device 20 can be used on containers, vessels, tanks or bottles that contain hazardous chemicals or restricted materials such as prescription drugs. The container (not shown) may contain a hazardous chemical that is to be accessed by authorized users who know how to safely handle the chemical. Accordingly, the security device 20 can prevent unauthorized access to the contents of the container. Although bottles and containers are used herein as examples of fluid sources having ports to access the fluids, one of ordinary skill in the art will readily appreciate that the security device 20 can be sized and configured to prevent access to any storage container and/or fluid supply line that includes an outer or inner threaded element which can connect to the security device 20. Those of skill in the art will also recognize that the security device 20 can be readily adapted for use in connection with any port that has internal threads and the security device 20 may be reconfigured dimensionally to provide the intended function in connection with any such internally threaded port. Still further, it is not necessary that a threaded element be present; one skilled in the art can readily adapt the security device to any connection means or a rod or stem.

Still further, the security device 20 can be used to provide secured access to restricted areas by using same in the place of door knobs, closet knobs or cabinet locks. Still further, the security device can likewise be applied to any rotary switch such as may be used to activate or deactivate electrical systems.

Subject to the restrictions discussed above regarding the uses of magnetic and non-magnetic materials, the security device 20 can be constructed from a number of materials or combination of materials depending on the application for which the security device 20 is used. For example, a security device 20 that is constructed for use with the hose bib 24, as described in the foregoing, may be constructed from the same materials as the hose bib 24. Alternatively, any type of metallic materials can be used such as brass, copper, aluminum, stainless steels, or the like and alloys thereof suitable to prevent corrosion and increase longevity because the hose bib 24 may be exposed to outdoor environment. The security device 20 may also be constructed from other materials that provide corrosion and weather resistance, for example, natural materials or plastic, glass or ceramic materials. Furthermore, the security device 20 may be constructed with materials that are not easily breakable or not susceptible to an unauthorized user who may attempt to use excessive force to break the security device 20. For applications where the security device 20 is used indoors, such as the foregoing described application of using the security device 20 for liquor or wine bottles, or area security, the security device 20 may be constructed in part from hard plastics so as to be lightweight and easy to mass manufacture. The components of the security device 20 may also be constructed from a variety of different materials and not simply one or two materials. For example, the free spinning body may be constructed from plastics so as to provide better weather resistance for outdoor applications. However, the inner body and other internal components may be constructed from a variety of metals. Still further, one skilled in the art will recognize that materials normal non-magnetic, such as plastics and ceramics can be converted into magnetic materials or magnets by inclusion in or encapsulation therein of magnetic materials.

While the particular preferred embodiments have been shown and described, it will be obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

We claim:

1. A device for securing a structure that includes a mating element comprising:
   a) an inner body having an inner surface adapted for attachment to a mating element,
   b) an outer cover located circumferentially about the inner body, the outer cover adapted to freely rotate around the inner body and a central longitudinal axis through the outer cover, the inner body and the mating element,
   c) a key having an outer shape configured for insertion into a like shaped opening in the outer cover, said key having first and second magnets located in first and second holes in a moveable frame, the frame positioned within a cavity in the key, the first and second holes spaced apart in relationship to each other, such that upon positioning of the key in the opening in the outer cover said first and second magnets are oriented with the south pole of the first magnet and the north pole of the second magnet facing the top of the inner body such that the south pole of the first magnet is adjacent the south pole of a longitudinally moveable magnet and the north pole of the second magnet is adjacent the north pole of the longitudinally moveable magnet such that the first and second magnets function to repel the longitudinally moveable magnet, and
   d) the longitudinally moveable magnetic comprising one or more magnets located in a central opening within the outer cover such that
      i. in the absence of the key inserted in the opening in the outer body, the longitudinally moveable magnet is in a first position held away from contact with the inner body by attraction to a magnetic plate within a surface of the cover adjacent to the longitudinally moveable magnet, and
      ii. with the key inserted into the opening in the outer body the longitudinally moveable magnet relocates to a second position spaced from the magnetic plate with a portion of the longitudinally moveable magnet residing in a bore in the top of the inner body,
   the outer cover, inner body, key and longitudinally moveable magnet in operative connection such that when the longitudinally moveable magnet is in the first position the outer cover rotates freely around the inner body and with the longitudinally moveable magnet in the second position the outer cover is operatively connected to the inner body such that a rotational force applied to the outer cover is transmitted to the inner body so as to rotate the inner body in relationship to the mating element.

2. The device of claim 1 wherein the mating element is a threaded connection.

3. The device of claim 1 wherein the frame has a multisided periphery, each side being equal in length.

4. The device of claim 3 wherein the cavities has an eight sided periphery sized to receive the eight-sided frame.

5. The device of claim 1 wherein frame and the cavity have a matching multisided periphery, each side thereof being equal in length and sized so the frame fits into the cavity.

6. The device of claim 5 wherein the frame has an eight-sided periphery.

7. The device of claim 1 wherein the key comprises a frame for receiving the first and second magnets, and a cavity for receiving the frame, the frame and cavity having the same multi-sided periphery, each side being equal in length, such that the first and second magnets can be placed in the holes and the frame can be placed in the cavity in multiple different orientations equal to the number of sides so as to provide multiple different combinations of orientation of the north and south poles of the magnets within the frame.

8. The device of claim 1 wherein the key comprises a frame for receiving the first and second magnets, and a cavity for receiving the frame, the frame and cavity each having the same eight-sided periphery, each side being equal in length, such that the first and second magnets can be placed in the holes and the frame can be placed in the cavity in eight different orientations so as to provide eight different combinations of orientation of the north and south poles of the magnets within the frame.

* * * * *